(12) United States Patent
Roth

(10) Patent No.: US 9,408,512 B2
(45) Date of Patent: Aug. 9, 2016

(54) SEPARATOR, SEPARATING DEVICE WITH SUCH A SEPARATOR, AND VACUUM CLEANER, ESPECIALLY WET VACUUM CLEANER, WITH SUCH A SEPARATOR OR SUCH A SEPARATING DEVICE

(71) Applicant: PROAIR GmbH Gerätebau, Argenbühl-Eglofs (DE)

(72) Inventor: Paul Roth, Isny (DE)

(73) Assignee: PROAIR GmbH Gerätebau, Argenbühl-Eglofs (DE)

( * ) Notice: Subject to any disclaimer, the term of this patent is extended or adjusted under 35 U.S.C. 154(b) by 352 days.

(21) Appl. No.: 14/224,135

(22) Filed: Mar. 25, 2014

(65) Prior Publication Data
US 2014/0283331 A1   Sep. 25, 2014

(30) Foreign Application Priority Data
Mar. 25, 2013   (DE) .......................... 10 2013 005 306

(51) Int. Cl.
A47L 9/10   (2006.01)
B01D 46/00   (2006.01)
A47L 9/18   (2006.01)

(52) U.S. Cl.
CPC ................. *A47L 9/102* (2013.01); *A47L 9/181* (2013.01); *A47L 9/188* (2013.01); *B01D 46/0005* (2013.01)

(58) Field of Classification Search
CPC ....... A47L 9/1683; A47L 9/106; A47L 9/102; A47L 9/181; A47L 9/188; B01D 46/0005
See application file for complete search history.

(56) References Cited

U.S. PATENT DOCUMENTS

| 2,173,960 | A | * | 9/1939 | Brock ........................ A47L 5/14 15/330 |
| 5,090,974 | A | | 2/1992 | Kasper et al. |
| 5,902,386 | A | * | 5/1999 | Gustafson ............... A47L 5/365 15/353 |
| 7,291,192 | B1 | * | 11/2007 | Lavasser ................... A47L 5/22 55/406 |
| 2004/0068826 | A1 | * | 4/2004 | Howie ..................... A47L 9/188 15/353 |
| 2004/0098958 | A1 | * | 5/2004 | Roth ...................... A47L 7/0004 55/455 |

* cited by examiner

*Primary Examiner* — Robert Scruggs
(74) *Attorney, Agent, or Firm* — Gudrun E. Huckett

(57) ABSTRACT

A separator for a vacuum cleaner has a cover part from which webs are projecting which are positioned along the circumference of the cover part at a spacing one behind the other with formation of through openings. At least some of the webs are without connection with each other at the end that is facing away from the cover part. The webs are elastically yielding transversely to the longitudinal direction. The webs are positioned in their mounting position with radial pretension on a spider which is fixedly seated on the motor shaft of the vacuum cleaner. Due to centrifugal forces occurring in operation of the vacuum cleaner as a result of the high rotary speed of the motor shaft, the webs of the separator are positioned with their free ends under high force on the spider. The separator is thus reliably entrained by the spider by friction.

21 Claims, 16 Drawing Sheets

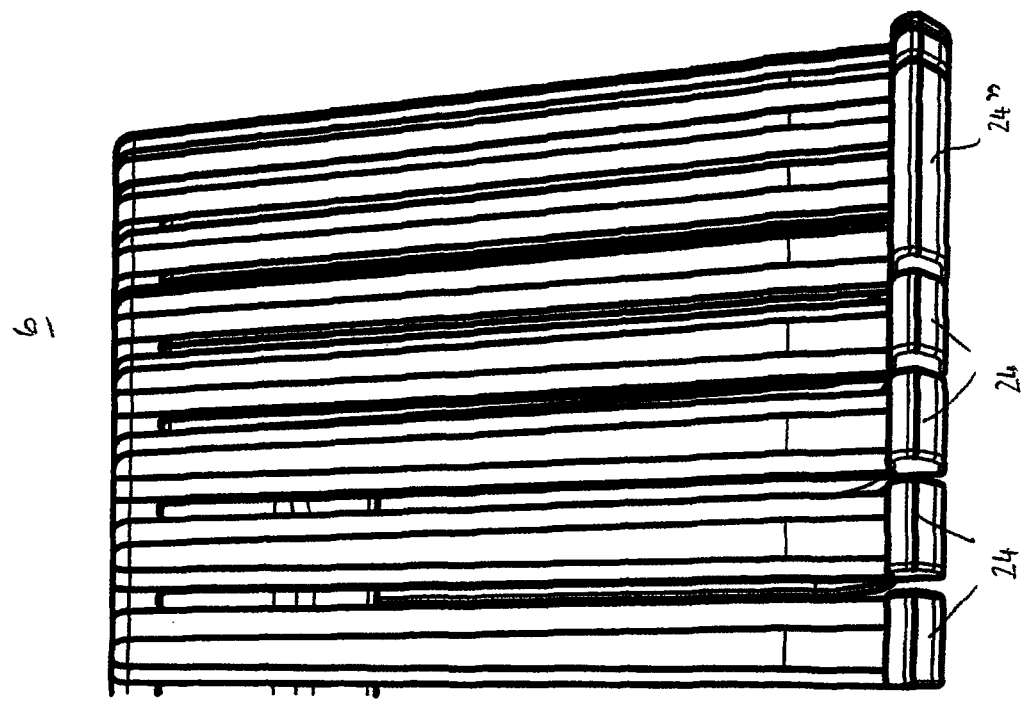
Fig. 8

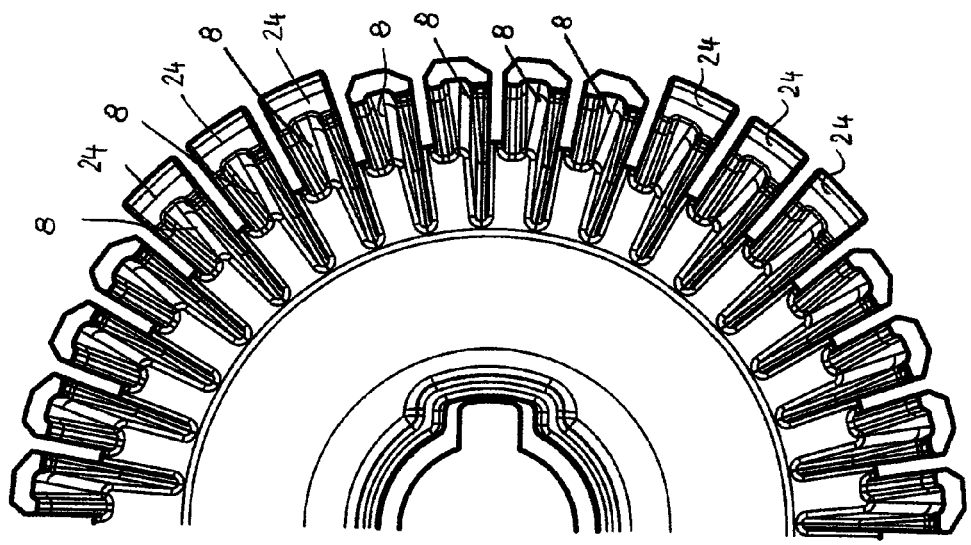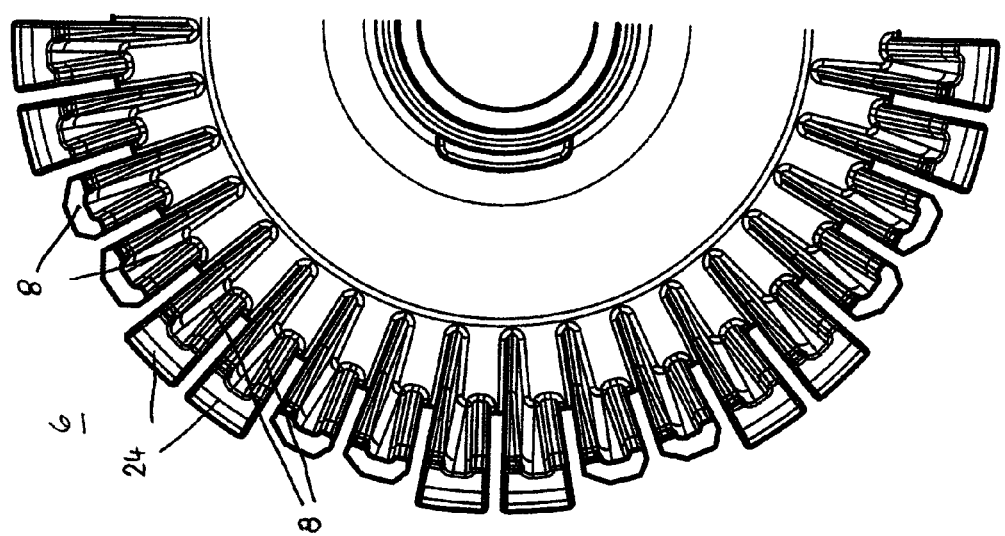
Fig. 9

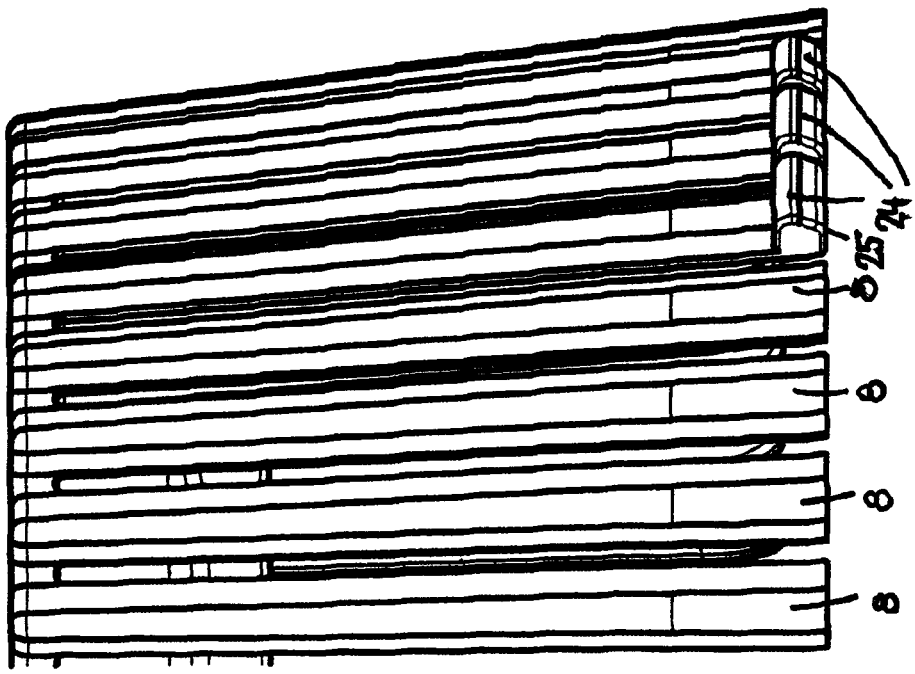
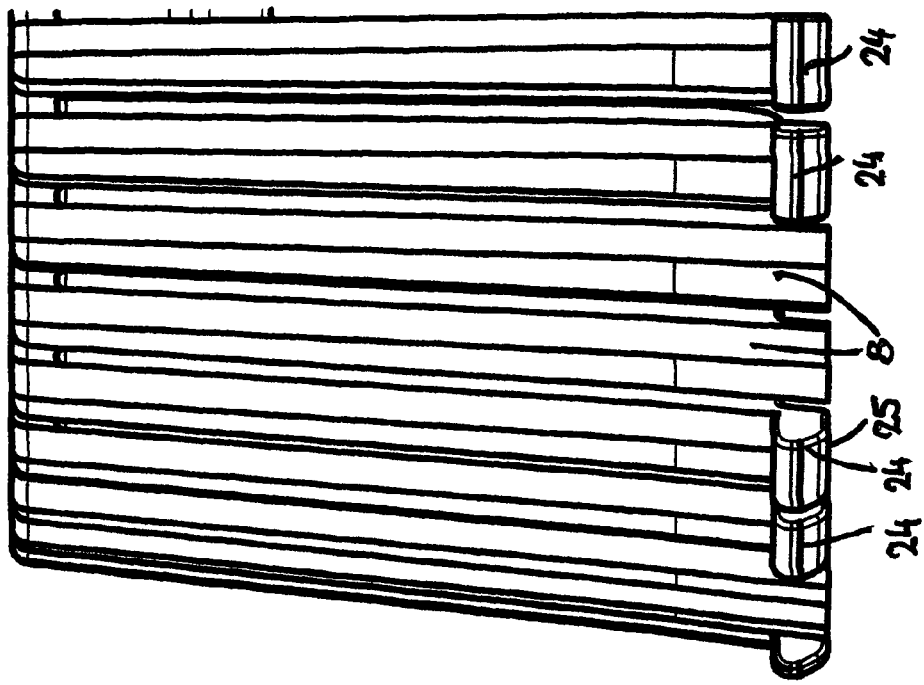
Fig. 10

SEPARATOR, SEPARATING DEVICE WITH SUCH A SEPARATOR, AND VACUUM CLEANER, ESPECIALLY WET VACUUM CLEANER, WITH SUCH A SEPARATOR OR SUCH A SEPARATING DEVICE

BACKGROUND OF THE INVENTION

The invention concerns a separator for a vacuum cleaner, in particular a wet vacuum cleaner, comprising a cover part from which webs extend away which are provided along the circumference of the cover part at a spacing one behind the other with formation of through openings. The invention further relates to a separating device with such a separator. The invention also concerns a vacuum cleaner comprising such a separator or separating device.

Separators or separating devices are used in vacuum cleaners, in particular in wet vacuum cleaners. Separators or separating devices have the object to retain residues of dirt/dust particles possibly still contained in the sucked-in air before the air will exit again from the vacuum cleaner to the exterior. The separators are seated rotationally fixed on the motor shaft and rotate at high rotary speed. In order to install the separator, they are fastened by means of a nut or screw. The use of fastening elements makes difficult mounting of the separator. It is disadvantageous that the fastening element may tighten as a result of the acceleration of the separator during operation of the vacuum cleaner. In this case, the separator can be removed for cleaning only with application of great force or even only by using an auxiliary tool. The webs of the separator are held together by a flange ring that is monolithically formed with the webs. As a result of the high centrifugal forces upon use of the vacuum cleaner, breakage often occurs at production-related joint lines of the separator that is formed as an injection-molded part. In order to avoid this, complex reinforcement rings such as crimped rings or wire rings are required which make manufacture of the separator more expensive and make difficult the cleaning action.

It is the object of the invention to configure the separator of the aforementioned kind, the separating device of the aforementioned kind as well as the vacuum cleaner such that, while it can be produced at low cost, a simple but still reliable installation of the separator is possible.

SUMMARY OF THE INVENTION

This object is solved with the separator of the aforementioned kind in accordance with the invention in that at least some of the webs at their end which is facing away from the cover part are without connection to each other and in that the webs are embodied to be elastically yielding transversely to their longitudinal direction.

The object is solved in case of the separating device of the aforementioned kind in accordance with the invention in that that the spider has at least one follower element on which the webs of the separator are resting under radial force in operation.

The vacuum cleaner in accordance with the invention comprises a separator or a separating device as described above.

In the separator according to the invention, the slats are secured only at one end on the cover part while at the other end they are without connection relative to each other or to other fastening parts. Since the webs are flexible, the connection between the separator and the spider can be produced very simply. In this context, the separator is mounted such that the webs in the mounted position are subjected to appropriate radial pretension. Since the separator in operation of the vacuum cleaner is rotating at high rotary speed, the webs are subjected to great centrifugal forces. The latter load the webs at their free ends radially in outward direction so that the connection is additionally secured. The higher the rotary speed and thus the centrifugal forces, the stronger the self-securing action.

Advantageously, at least two of the webs at the free end are provided with a locking contour by means of which the separator according to the invention can be secured simply by means of a locking connection.

In an advantageous embodiment, the locking contour of the separator has the same width as the webs on which it is provided. The locking contour is therefore of satisfactory width so that a secure locking action is ensured.

The locking contour can be also designed in another embodiment such that it extends across at least two neighboring webs. The locking contour has therefore a greater width in circumferential direction which is advantageous with regard to the safety of the locking connection.

The locking contours are advantageously monolithically formed with the web so that a very low cost manufacture of the separator is provided.

Advantageously, the locking contour is a locking projection.

The separator can be designed such that each web is provided at the free end with a locking contour. In this case, all webs are secured by the locking connection when the separator is mounted. However, there is also the possibility to provide only some of the webs, at least however two of the webs, with a locking contour. When only some of the webs are provided with a locking contour, these webs are provided on the separator in such a way that a reliable installation and a reliable securing action by means of the locking contours is ensured.

It is moreover possible to use differently designed locking contours distributed about the circumference of the separator. Accordingly, some of the webs can be provided with locking contours that have the same width as they, while other locking contours are designed such that they extend across two, three, or more webs. In this way, the type of locking connection can be matched to the respective situation of use of the separator.

In order for the locking connection to be reliably realized, the locking projection is advantageously provided with a slanted surface which is provided on the side of the locking projection which is facing away from the web. When thus the separator is pushed in axial direction into its mounted position, then the slanted surface of the respective locking projection moves onto a corresponding counter locking element wherein the slanted surface ensures that the corresponding web is elastically bent transversely to its longitudinal direction.

In order for the locking connection to lock reliably, in a preferred embodiment the locking projection on the side which is facing the web is provided with a blocking surface. It ensures that the locking connection cannot be released accidentally.

In a preferred embodiment, the webs extend from the cover part at a slant outwardly. In this way, the separator has a conical wall which is formed by the webs. The slanted position of the webs has advantageously the effect that the webs, when the separator is installed, is held with a sufficiently high radial pretension so that the reliability of the locking connection is enhanced.

The separator can also be designed such that the webs are positioned on a cylinder wall. Due to the high centrifugal forces which occur in operation the webs are elastically bent in radial direction outwardly.

The separator is preferably provided with at least one form-fit element which contributes to a simple assembly. By means of the form-fit element, the separator can be installed in a precise position in a simple way.

In the separating device according to the invention, the spider is provided with at least one follower element on which the webs of the separator are resting under radial force in operation.

The follower element is preferably designed as a ring which is engaged from below by the locking contour of the separator. The annular configuration of the follower element is beneficial when all of the webs of the separator are provided at the free end with the locking contour. In this case, the locking contours of all webs can interact in a simple way with the annular follower element.

The follower element can be designed in another embodiment as an annular flange which is provided with locking openings for the locking contours. Such a configuration of the spider is advantageous when not all but only a few of the webs of the separator are provided with a locking contour. The corresponding locking contours then lock in the locking openings of the spider.

The webs which are yielding elastically transversely to their longitudinal direction are first bent in radial direction inwardly upon placement of the separator onto the spider until the corresponding locking contours of the follower element of the spider are engaged from below. In this context, the dimensions are selected such that the webs in the mounted position are resting with radial pretension on the follower element.

The webs of the separator must not have locking contours. In this case, the follower element is advantageously formed by an annular flange whose wall is slanted in radial direction inwardly. Under the high centrifugal forces occurring in operation, the webs are contacting with great radial force areally the inner side of the annular flange. The centrifugal forces are so high that the spider reliably entrains the separator even without positive form-fit connection between both components.

In order to facilitate the placement of the separator onto the spider, in an advantageous embodiment the separator and the spider are provided with interacting centering parts by means of which an axial alignment of the separator relative to the spider is achieved.

The centering parts are advantageously annular projections whose axis is coaxial with the axis of the spider and of the separator. The annular configuration of the centering parts facilitates joining of spider and separator.

The vacuum cleaner according to the invention is characterized in that it has the lockable separator.

The vacuum cleaner according to the invention is characterized in that it comprises the separating device with the spider and the lockable separator.

Further features of the invention result from the additional claims, the description, and the drawings.

BRIEF DESCRIPTION OF THE DRAWINGS

The invention will be explained in more detail with the aid of embodiments illustrated in the drawings.

FIG. 8 is a side view of the separator according to FIG. 7.

FIG. 9 shows in illustrations according to FIGS. 7 and 8 a further embodiment of the separator according to the invention.

FIG. 10 shows in illustrations according to FIGS. 7 and 8 another embodiment of the separator according to the invention.

DESCRIPTION OF PREFERRED EMBODIMENTS

Figure 1:
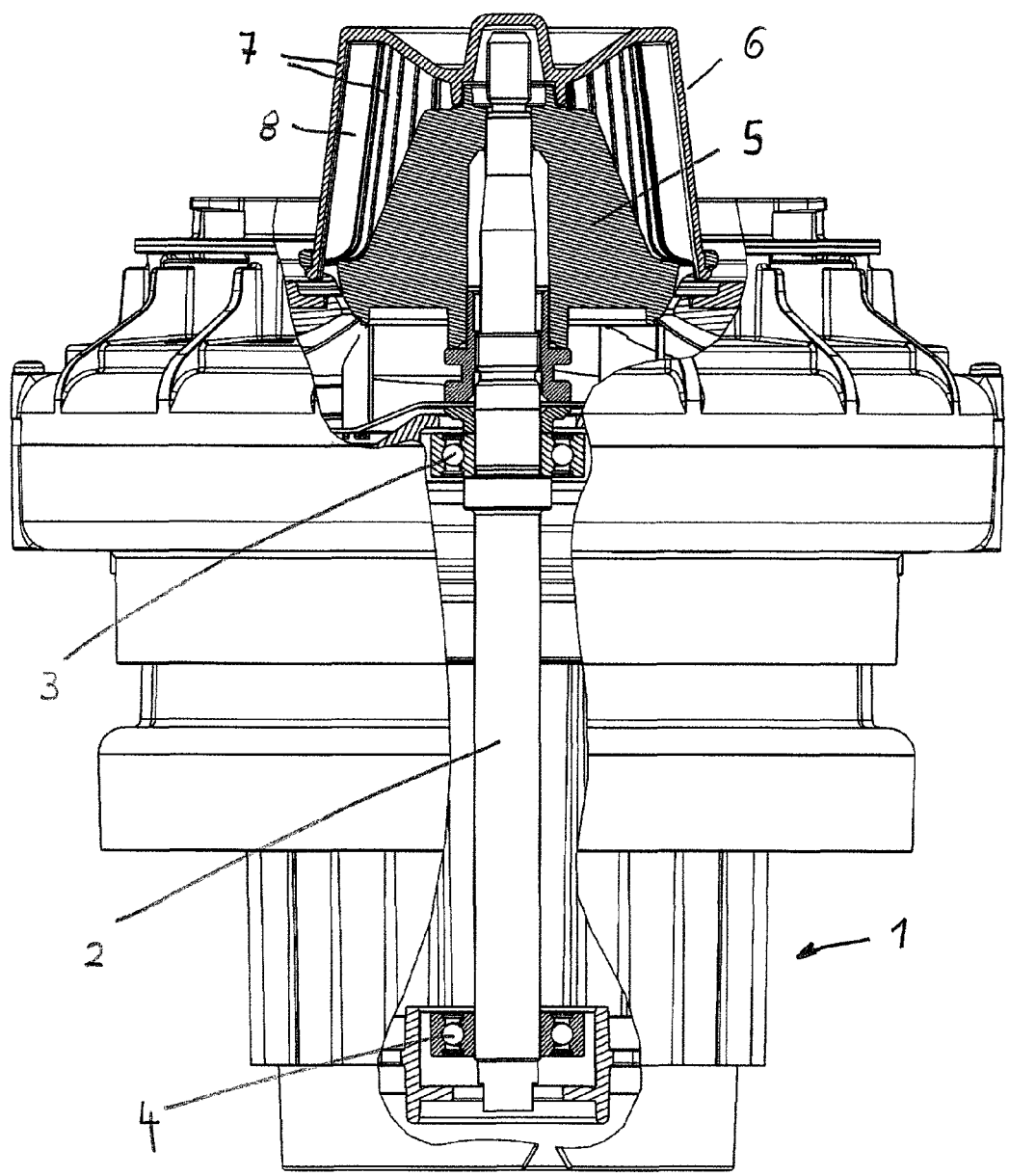
FIG. 1 shows in axial section a motor of a wet vacuum cleaning device with a separator according to the invention.

FIG. 1 shows a motor 1 for a vacuum cleaner, in particular a wet vacuum cleaner, that is used, for example, for cleaning floors and the like. The wet vacuum cleaner is known and is therefore explained in the following only briefly. It has a trolley support on which a liquid container is arranged. The motor 1 is upright (on) in the liquid container and is sealed relative to the liquid. The motor 1 has an upright motor shaft 2 which, with the aid of two bearings 3, 4 that are advantageously ball bearings, is rotatably supported. As is known, the motor 1 is an electric motor. On the upper end of the motor shaft 2, a spider 5 is attached, rotationally fixed, which will be explained in detail with the aid of FIGS. 11 to 16. The spider 5 is surrounded by a separator 6 which is connected detachably and rotationally fixed to the spider 5. The separator 6 has slot-shaped through openings 7 extending across its height which are separated from each other by narrow webs 8.

When the wet vacuum cleaner is in use, air is sucked in by means of a vacuum hose into the liquid container. The air that is loaded with dirt/dust particles flows through the liquid, preferably water, in the liquid container. In the liquid, most of the dirt and/or dust particles contained in the sucked-in air are retained. The air with the residual dirt/dust proportion flows then through the through openings 7 into the separator 6 which is rotating with the motor shaft 2. The separator 6 separates dirt/dust particles which are still possibly contained in the air from the air so that clean air exits from an air exit opening of the wet cleaning device.

FIGS. 3 to 6 show a first embodiment of a separator 6. It has a circular contour and has a cover 9 at the end face which has a circular contour. The cover 9 is formed monolithic with the webs 8 which extend away from the cover 9. The webs 8 are positioned at a small angle at a slant in outward direction so that the outer longitudinal edge 10 of the webs 8 is positioned on a conical wall that widens in a direction away from the cover 9.

Figure 6:
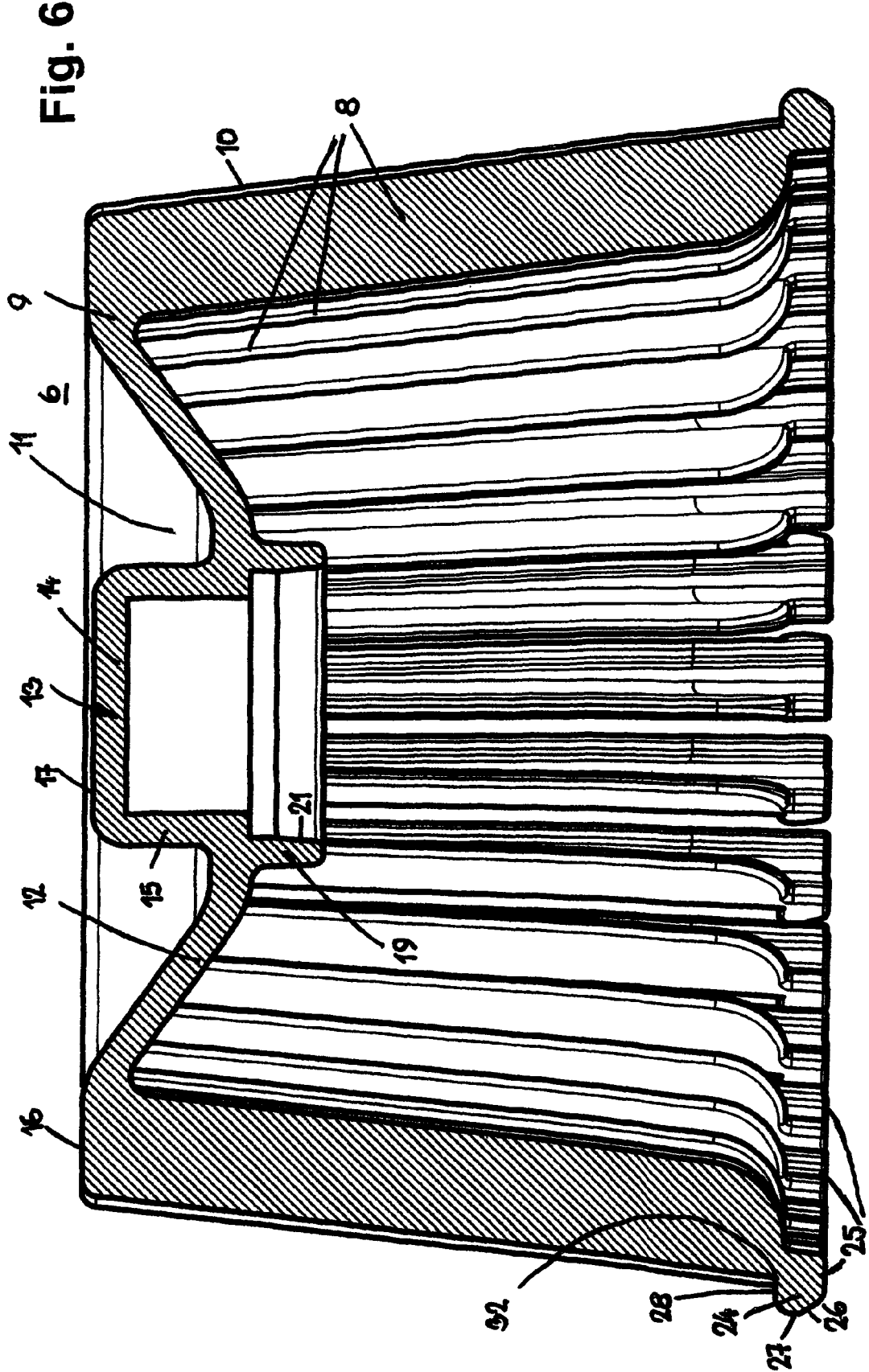
FIG. 6 shows in axial section and in enlarged illustration a second embodiment of a separator according to the invention.

The cover 9 has an annular depression 11 (FIG. 6) whose bottom 12 is conically formed. The bottom 12 adjoins a central elevation 13. It has a planar top 14 with a cylindrical wall 15 adjoining its rim. It is monolithically formed with the bottom 12 of the depression 11. The elevation 13, as can be seen in FIG. 6, is designed such that the top 14 does not project past the end face 16 of the cover 9. Advantageously, the end face 17 of the top 14 is recessed slightly relative to the end face 16.

The elevation 13 is provided with a radial bulge 18 (FIG. 4) by means of which a rotationally fixed form-fit locking connection to the spider 5 can be produced. The bulge 18 is designed such that it extends across the height of the cylindrical wall 15. The spider 5, as will be explained infra, is provided with an appropriate counter form-fit locking element that, upon placement of the separator 6, engages the bulge 18 and in this way produces the rotationally fixed connection between the separator 6 and the spider 5.

Figure 2:
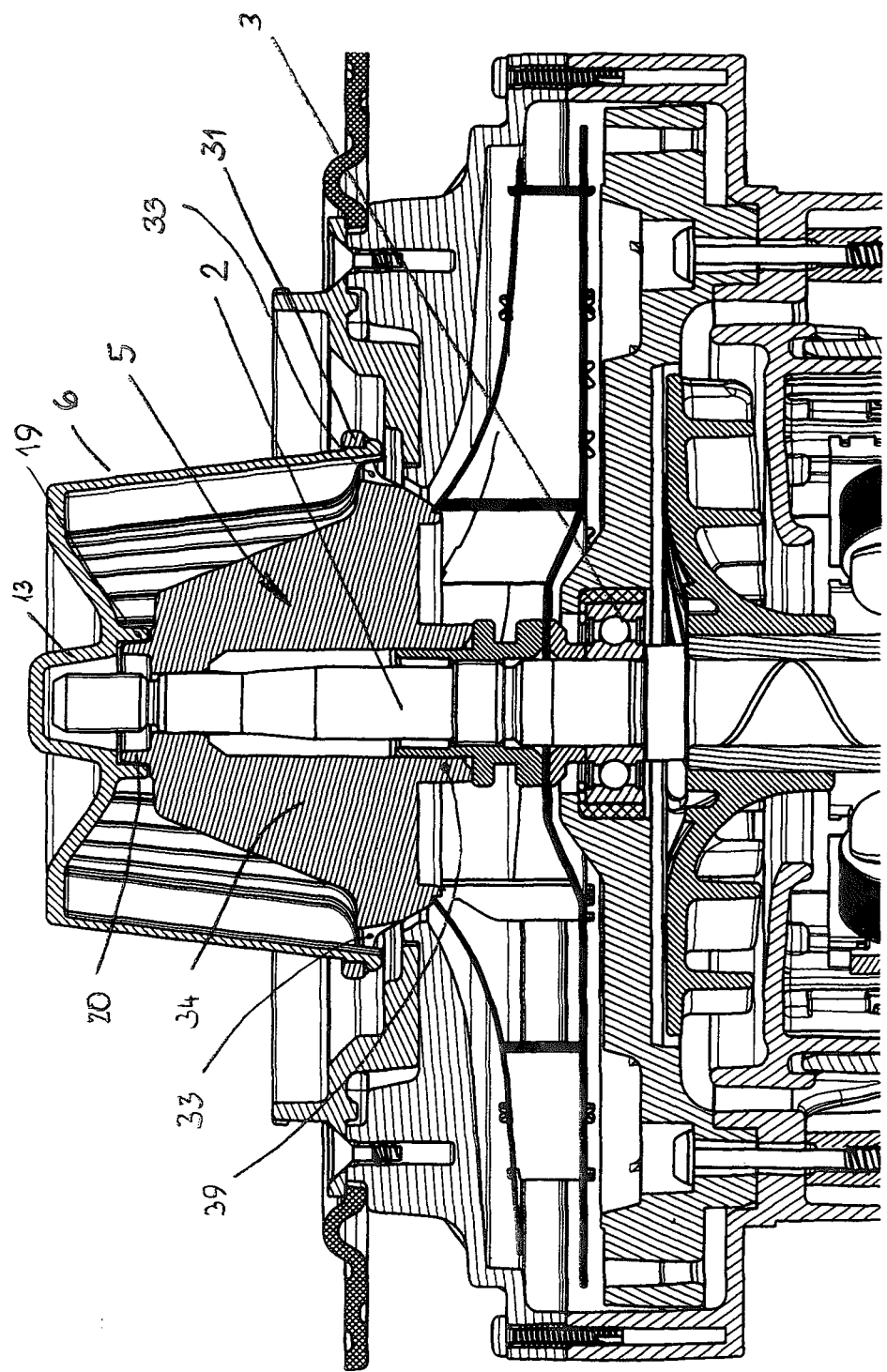
FIG. 2 shows in an enlarged illustration a part of the motor according to FIG. 1.
Figure 3:
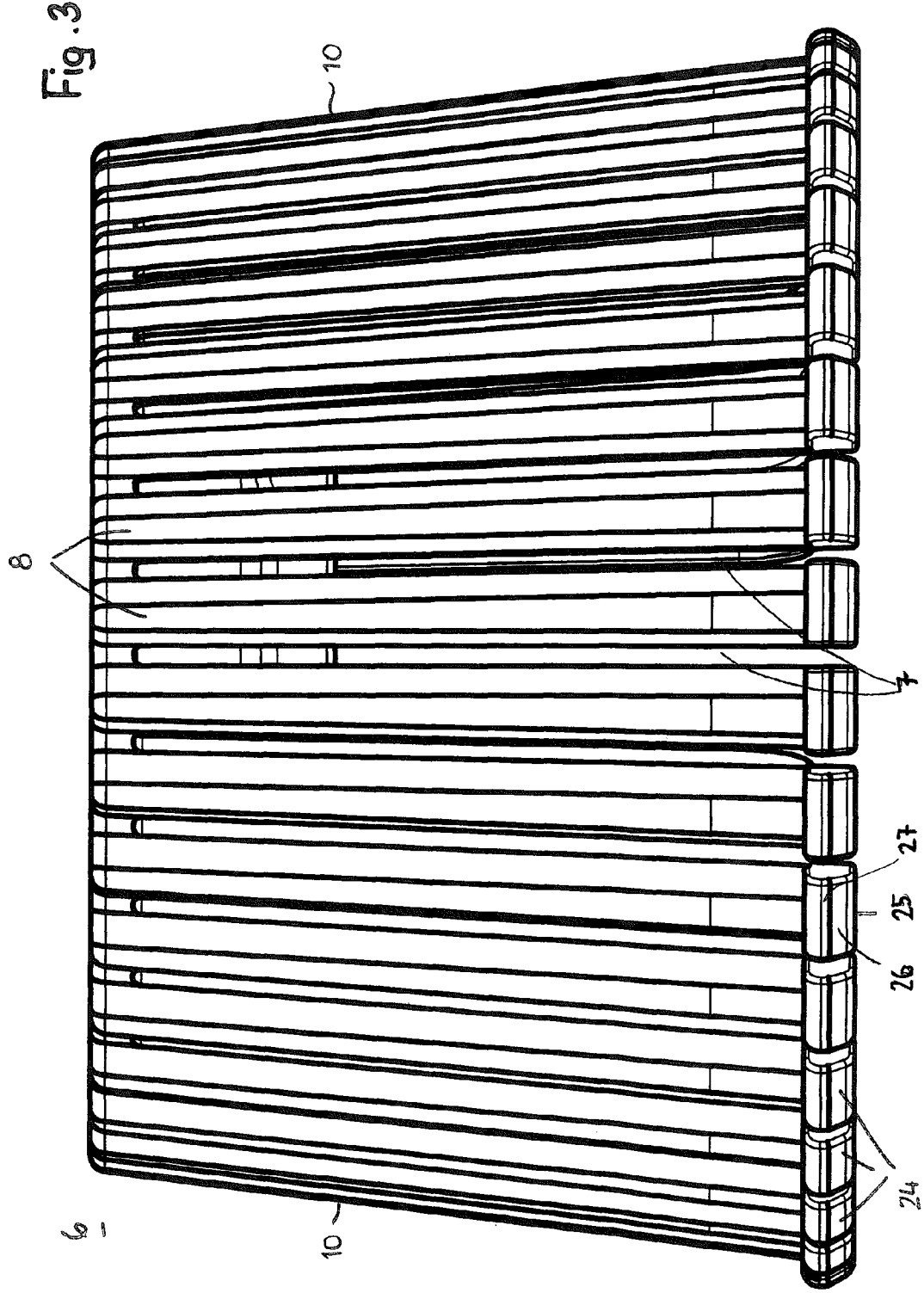
FIG. 3 shows in an enlarged illustration and in a side view a separator according to the invention.

At the transition from bottom 12 of the depression 11 into the wall 14 of the elevation 13, there is an annular projection 19 which extends from the bottom 12 in opposite direction relative to the wall 15 of the elevation 13. The projection 19 serves as a centering means upon placement of the separator 6 onto the spider 5. As can be seen in FIG. 2, at the end which is facing the elevation 13, the spider 5 is provided with an annular projection 20 which is surrounded by the projection 19 of the separator 6. The two projections 19, 20 are contacting each other about their circumference with their facing wall surfaces.

In order for the separator 6 to be placed with reliable centering action on the spider 5, the projection 19 at its inner side is provided with a slanted portion 21 which extends from the free end of the projection 19 across a portion of the axial height of the projection 19. As a result of the slanted portion 21 the inner diameter of the projection 19 widens in the direction of the free end of the projection 19.

The projection 20 of the spider 5 can be provided with an appropriate slanted portion on its exterior side. It is however also possible that the outer side of the projection 20 of the spider 5 extends conically across the entire axial height. As a result of the slanted portion, the separator 6 can be placed without problem positionally precise onto the spider 5. The bulge 18 extends also across the height of the projection 19.

The separator 6 is advantageously monolithically manufactured from a suitable plastic material.

The webs 8 are of the same configuration relative to each other and are arranged upright. The longitudinal sides 22, 23 (FIG. 4) are positioned approximately in a radial plane of the separator 6. Between the webs 8 which in circumferential direction are positioned at a minimal spacing one behind the other, the through openings 7 are provided which are delimited by the longitudinal sides 22, 23 of the respective neighboring webs 8. The through openings 7 are radially arranged and have across their radial length a constant width. The through openings 7 each are designed to extend axially. The webs 8 and thus the through openings 7 can however also be slantedly positioned across their axial length, i.e., the webs or the through openings have a gradient in the circumferential direction.

The webs 8 are provided at their free end with a radially outwardly oriented locking contour which, in the illustrated embodiment, is a locking projection 24. The locking projections 24 are monolithically formed with the webs and are identical relative to each other. As can be seen in FIG. 6, the locking projections 24 have a planar bottom side 25. When the separator 6 is mounted, the bottom sides 25 are positioned in a common radial plane of the separator 6. At an obtuse angle, a slanted surface 26 adjoins the bottom side 25 and extends across a portion of the height of the locking projection 24, for example, approximately to half the height. The slanted surface 26 passes onto a narrow planar surface 27 which in an arc shape passes into a planar top side 28 of the locking projection 24. The top side 28 is positioned advantageously parallel to the bottom side 25 and extends to the radially outwardly positioned longitudinal side 10 of the corresponding web 8.

Figure 4:
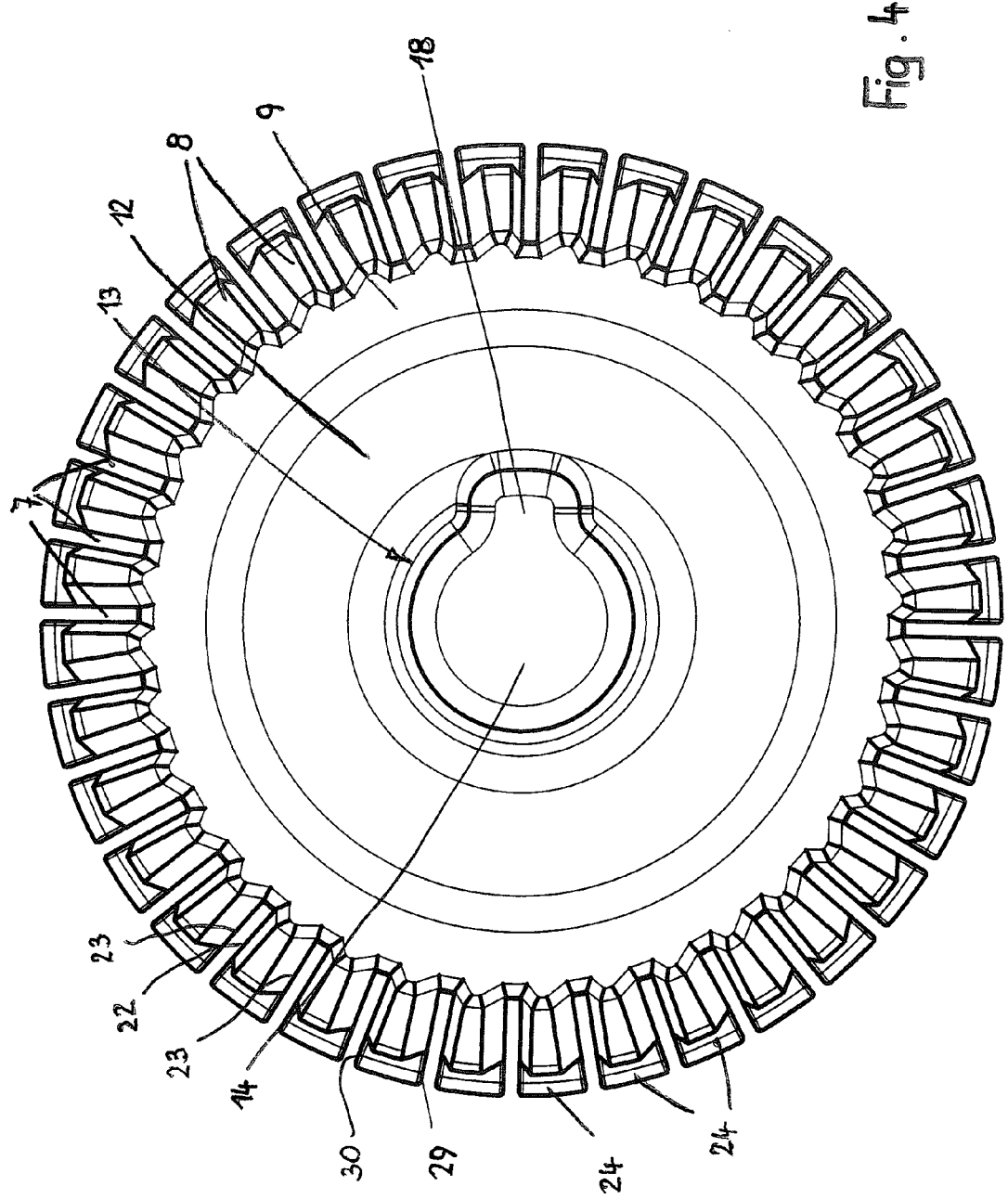
FIG. 4 is a plan view of the separator according to FIG. 3.
Figure 5:
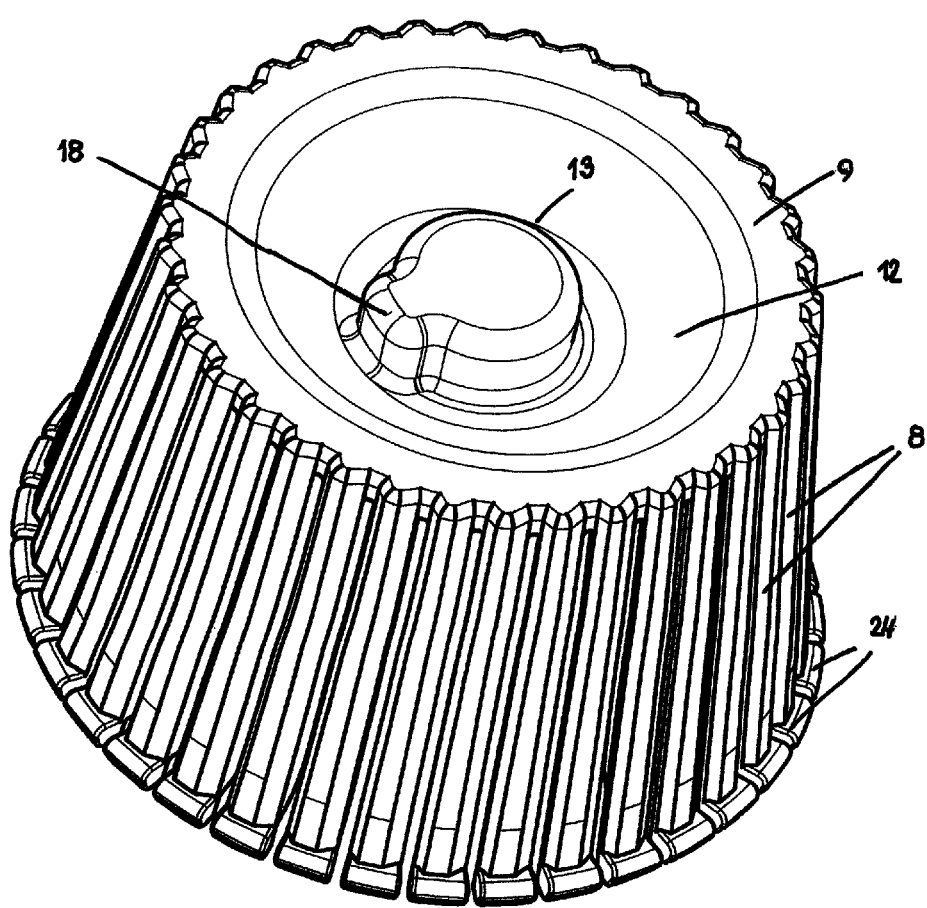
FIG. 5 shows the separator according to FIG. 3 in perspective illustration.

The locking projections 24 extend across the circumferential width of the web 8 (FIG. 4). The locking projections 24 have planar lateral surfaces 29, 30 which, viewed in axial direction of the separator (FIG. 4), are positioned on an extension of the longitudinal sides 22, 23 of the webs 8.

The webs 8 are slanted in outward direction so that the planar surfaces 27 of the locking projections 24 are positioned on a diameter that is greater than the outer diameter of the end face 16 of the cover 9. The spider 5 has a circumferentially extending ring 31 (FIG. 2) whose inner diameter is smaller than the diameter of the webs 8 at the transition 32 (FIG. 6) from the outer longitudinal rim 10 into the top side 28 of the locking projection 24. This results in that the webs 8 in the mounted position are radially elastically bent inwardly and are contacting with pretension the ring 31 of the spider 5. Since the locking projections 24 have the surfaces 26 which are oriented at a slant outwardly, the separator 6 can be attached in a simple and reliable way on the spider 5. Upon placement of the separator 6 onto the spider 5, the webs 8 during the plug-in process are elastically bent inwardly when the locking projections 24 meet the ring 31 of the spider 5. As soon as the projections 24 have passed the ring 31, the webs 8 spring back in the direction of their initial position until they are contacting with the transition area 32 under radial pretension the inner side of the ring 31 (FIG. 2). The locking projections 24 engage from below the ring 31. Since the top side 28 of the locking projections 24 that forms a blocking surface is planar, a reliable locking action of the separator 6 on the spider 5 is ensured. The reliable locking action of the separator 6 on the spider 5 is favored in that, due to the bulge 18, the separator 6 can be pushed only in a certain angular position onto the spider 5. The annular projection 19 of the separator 6 centers by interaction with the annular projection 20 of the spider 5 the separator 6 on the spider 5; this facilitates the assembly.

Since in operation of the vacuum cleaner the separator 6 is driven by the motor shaft 2 and the spider 5 at high rotary speed, a radially outwardly oriented centrifugal force is acting on the webs 8. It ensures that the webs 8 in the area of the transition 32 are forced strongly against the inner side of the ring 31 of the spider 5 so that during operation of the vacuum cleaner a reliable connection between the separator 6 and the spider 5 is ensured. The self-securing action increases even more with increasing rotary speed of the motor shaft 2 and thus of the separator 6. Mounting of the separator 6 is simple because no additional fastening means such as nuts, screws and the like are required. The separator 6 can also be pulled off easily from the spider 5 without this requiring additional tools.

The ring 31 of the spider 5 is connected by radially extending stays 33 (FIG. 2) with a base member 34 of the spider 5. As an example, four connecting stays 33 are sufficient in order to connect the ring 31 with the base member 34. These stays are positioned at angular spacings of 90° relative to each other. When the separator 6 is mounted, the stays 33 are positioned within corresponding through openings 7 of the separator 6.

The webs 8 of the separator can have any suitable cross-sectional shape. For example, the webs 8 can be strip-shaped but can also have an L-shaped cross-section. In case of an L-shaped cross-sectional configuration, the longer leg is positioned approximately in radial direction while the angled shorter leg extends in circumferential direction and is provided on the radial outer side of the longer legs.

Figure 7:
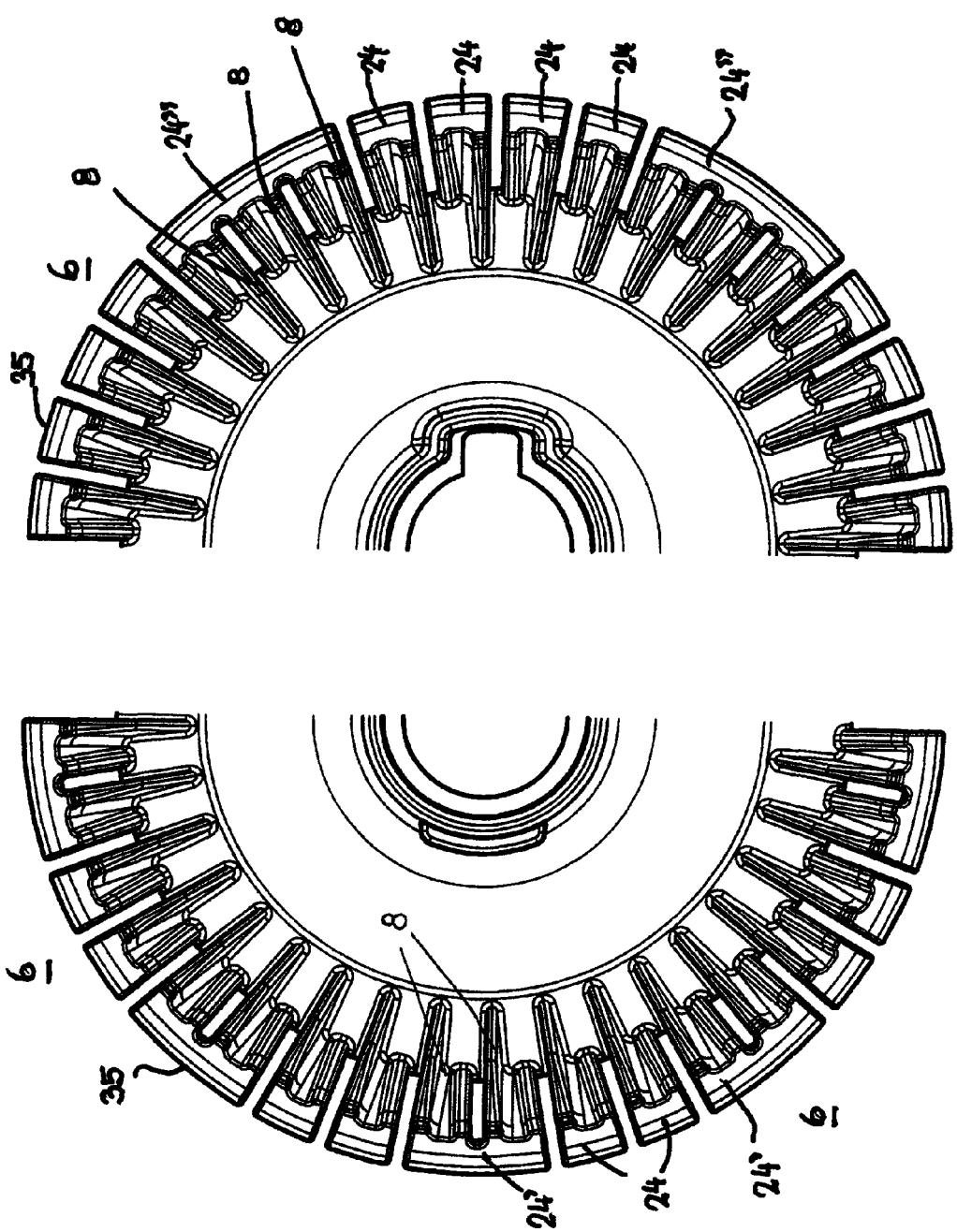
FIG. 7 shows in a plan view two halves of two further embodiments of the separator according to the invention.

FIG. 7 shows in the left half a separator 6 in which the locking projections 24' are partially extending across two neighboring webs 8. The locking projections 24' are monolithically formed with the webs 8. The webs 8 that are positioned in between each have, as in the preceding embodiment, a locking projection which is then more narrow than the locking projections 24' that is associated with two neighboring webs 8. In the illustrated embodiment, the distribution is provided such that between two longer locking projections 24' two narrow locking projections 24 are arranged, respectively. The longer locking projections 24' with regard to their shape are identically embodied relative to the more narrow locking projections 24. As in the preceding embodiment, the locking projections 24, 24', viewed in axial direction, can have straight outer sides. In the illustrated embodiment, the outer sides of the projections, viewed in axial direction, are positioned on a circle 35 whose center is coaxial with the axis of the separator 6.

The longer locking projections 24' impart a higher stability to the separator 6. All locking projections 24, 24', as can be seen in the preceding embodiments, are engaging the ring 31 of the spider 5.

The right half of FIGS. 7 and 8 shows an embodiment in which some of the locking projections 24" extends across three webs 8 so that an even higher stability of the separator 6 will result. As an example, the separator 6 between the locking projections 24" has three locking projections 24, each provided on a web 8. The outer sides of the locking projections 24, 24" are also positioned on the circle 35 so that the center point is positioned coaxial with the axis of the separator 6. All locking projections 24, 24" are in engagement with the ring 31 of the spider 5. In other respects, this separator is identical to the preceding embodiment.

FIGS. 9 and 10 show separators 6 in which only some of the webs 8 are provided with locking projections. The separator 6 which is illustrated in the left half of FIGS. 9 and 10 is designed such that alternatingly two webs 8 each without locking projections and two webs 9 each with the locking projections 24 are provided. This distribution of the locking projections 24 is provided about the entire circumference of the separator 6. The locking projections 24 are formed in accordance with the embodiment of FIGS. 3 to 6 and provided on the webs 8. In this way, a safe snap-on connection between the separator 6 and the spider 5 is also provided. The webs 8 without locking projections are positioned in mounted position also with pretension on the inner side of the ring 31 of the spider 5. As illustrated in FIG. 10, the webs 8 without locking projections extend so far that their free end is at the level of the bottom side 25 of the locking projections 24.

In the embodiment of the right half of FIGS. 9 and 10, the locking projections 24 are provided on three adjacently positioned webs 8. Four webs 8 without locking projections then follow in circumferential direction of the separator. Three webs with locking projections 24 then follow again. As in the preceding embodiment, the webs 8 without locking projections have such a length that their free ends are positioned at the level of the bottom side 25 of the locking projections 24 (FIG. 10). The locking projections 24 with the webs 8 are in other respects identically embodied as in the embodiment according to FIGS. 3 to 6. In the mounted position, the locking projections 24 engage from below the ring 31 of the spider 5 while the webs 8 without locking projection are contacting with elastic deformation the inner side of the ring 31.

The distribution of the webs with and without locking contours is illustrated in FIGS. 7 through 10 only in an exemplary fashion. This distribution, depending on the situation of use of the separator, can be differently designed. For example, on a separator locking contours can be provided that are monolithically connected with two webs 8 and with three or even four webs 8. In this context, also webs 8 without locking contours or webs 8 can be provided that each have a locking contour. The disclosed embodiments are therefore not to be viewed as a limitation with regard to the number and/or distribution and/or configuration of the locking contours.

Figure 11:
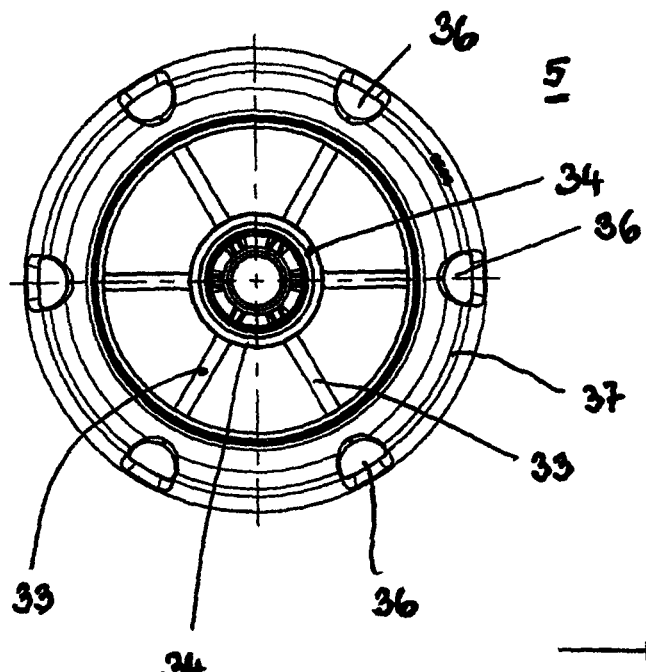
FIG. 11 is a plan view of a spider on which the separator according to the invention is fastened.
Figure 12:
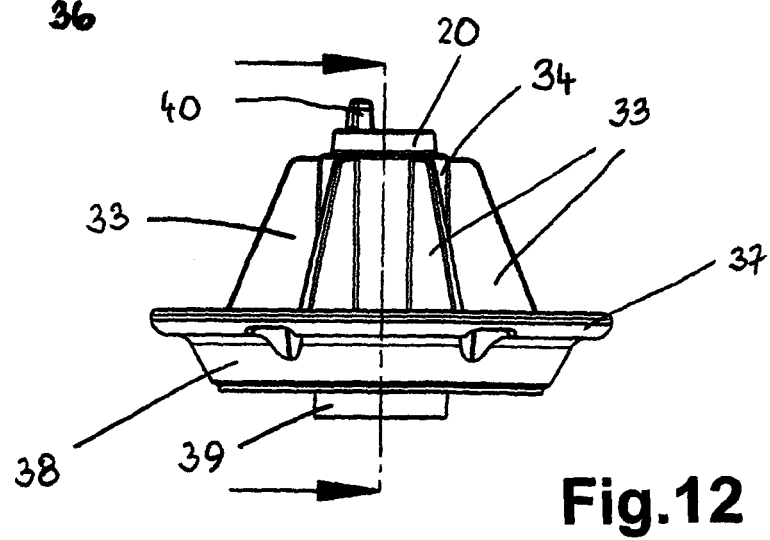
FIG. 12 shows the spider according to FIG. 11 in a side view.
Figure 13:
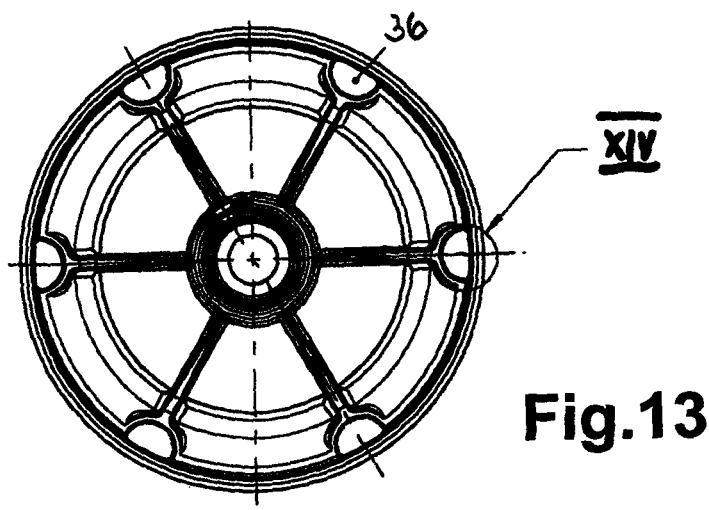
FIG. 13 shows the spider according to FIG. 11 in a bottom view.
Figure 14:
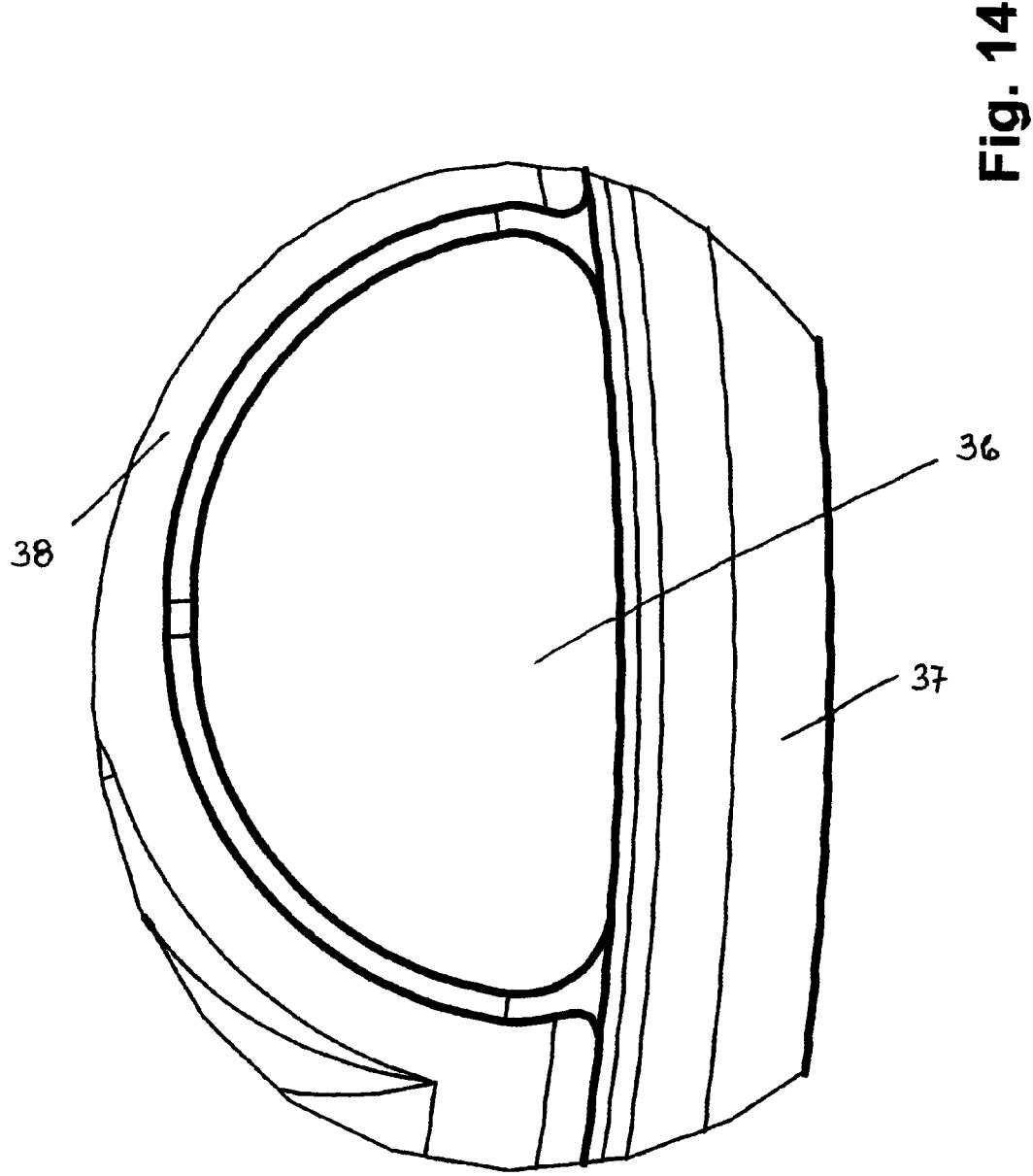
FIG. 14 shows in a greatly enlarged detail view the detail XIV of FIG. 13.
Figure 15:
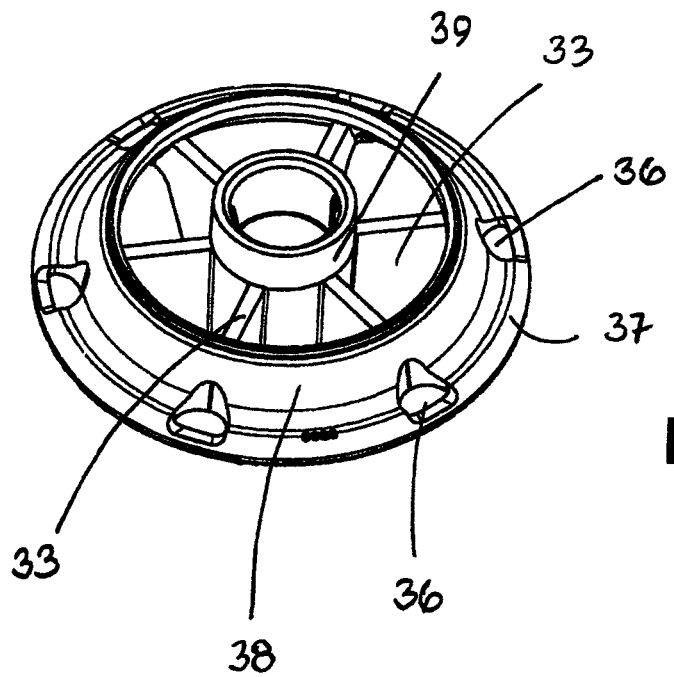
FIG. 15 shows in perspective illustration the spider according to FIG. 11.
Figure 16:
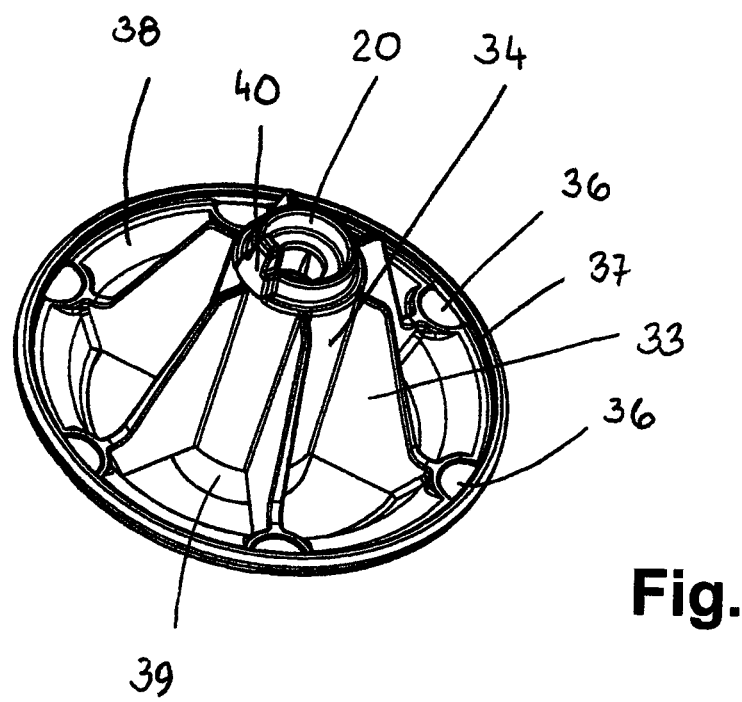
FIG. 16 shows in another perspective illustration the spider according to FIG. 11.

FIGS. 11 to 16 show an embodiment of a spider 5 which differs from the embodiment according to FIGS. 1 and 2 in that no circumferentially extending ring 31 for the locking projections is provided but locking openings 36 distributed about the circumference. The spider 5 has the base member 34 which is cylindrically configured and with which the spider 5 is seated, rotationally fixed, on the motor shaft 2. Vane-like stays 33 extends away from the base member 34 in radial direction which are positioned upright and connect the base member 34 with an annular flange 37 that surrounds the base member 34 at a radial spacing. The annular flange 37 has the openings 36 which in an exemplary fashion are positioned at an angular spacing of 60° along the circumference of the annular flange 37. The stays 33 are arranged such that their imaginary extensions are extending through one of the locking openings 36 (FIG. 11). The annular flange 37 is provided near the bottom end of the spider 5 in the mounted position and passes into a conical body 38 which is projecting past the annular flange 37 in downward direction (FIG. 12). The conical body 38 tapers in the direction of its free end and surrounds the base member 34, viewed in axial direction of the base member, at a radial spacing.

The base member 34 is provided with an annular projection 39 which has approximately the same outer diameter as the base member 34 and projects past the conical member 38 in downward direction. As shown in FIG. 2, the projection 39 serves as a centering means with which the spider 5 can be centered on the motor shaft 2.

At the opposite end, the base member 34 is provided with an annular projection 20 which is interacting with the annular projection 19 of the separator 6 in the described way. The stays 33 extend between the two annular projections 20, 39 and widen, preferably continuously, away from the projection 20 to the ring 39.

A nose 40 projects axially past the projection 20 which in the mounted position is form-fittingly projecting into the bulge 18 of the separator 6.

The locking openings 36 extend into the conical body 38. The locking openings 36 have a part-circular contour and have such an opening cross-section that, upon placement of the separator 6 onto the spider 5, the locking projections 24, 24', 24" reach the locking openings 36 and engage from below the annular flange 37 in the area of these locking openings. When using the spider according to FIGS. 11 to 16, the separators are designed such that only the webs which are positioned at the level of the locking openings 36 are provided with locking projections. The other webs 8 of the separator have no locking projections. In the mounted position, all webs 8 of the separator 6 are elastically pretensioned in radial direction inwardly so that a safe connection between the spider 5 and the separator 6 is ensured. By means of the nose 40 the separator 6 upon placement onto the spider 5 is aligned such that the locking projections of the corresponding webs 8 of the separator mandatorily engage the locking openings 36.

The spider 5 is made advantageously monolithically of plastic material. The stays 33 ensure a satisfactory strength of the spider 5.

Figure 17:
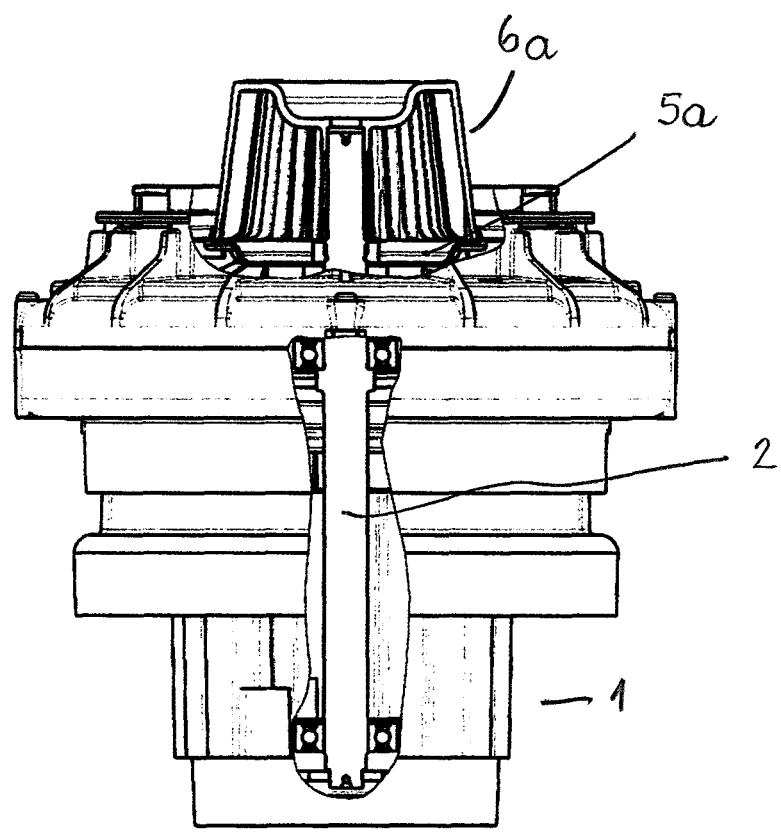
FIG. 17 shows a further embodiment of a separator according to the invention attached to a motor of a wet vacuum cleaning device in axial section.

FIG. 17 shows an embodiment of the separator 6a in which the bulge 18 is not provided. The rotationally fixed connection between the separator 6a and the spider 5a is realized exclusively by frictional connection.

The conical bottom 12a of the depression 11a of the separator 6a passes into a radially extending bottom section 12b that has centrally an opening 41. It is delimited by projection 19a which extends from the rim of the opening 41 in the direction toward the motor 1. The projection 19a serves to axially secure the separator 6a on the motor shaft 2. The projection 19a is embodied to be elastically widenable at least at the free end. For this purpose, the projection 19a can be comprised of at least two tongues that are spring-elastic and at their free ends have a radially inwardly projecting nose 42. The motor shaft 2 is provided with an annular groove 43 in which the noses 42 of the projection 19a engage. Mounting of the separator 6a is possible in a simple way because it must only be placed with the projection 19a onto the motor shaft 2. The tongues will then elastically widen until the noses 42 engage the annular groove 42.

Figure 20:
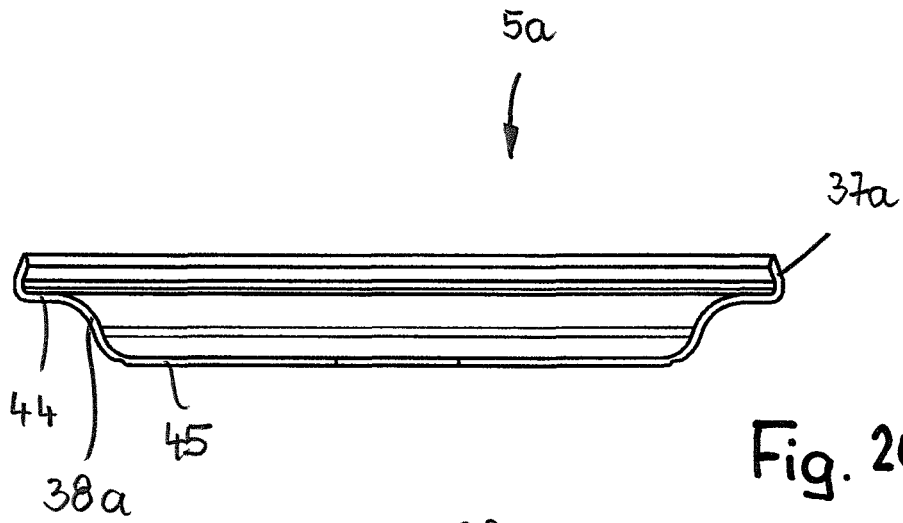
FIG. 20 shows in a side view a further embodiment of a spider on which the separator according to the invention is attached.
Figure 21:
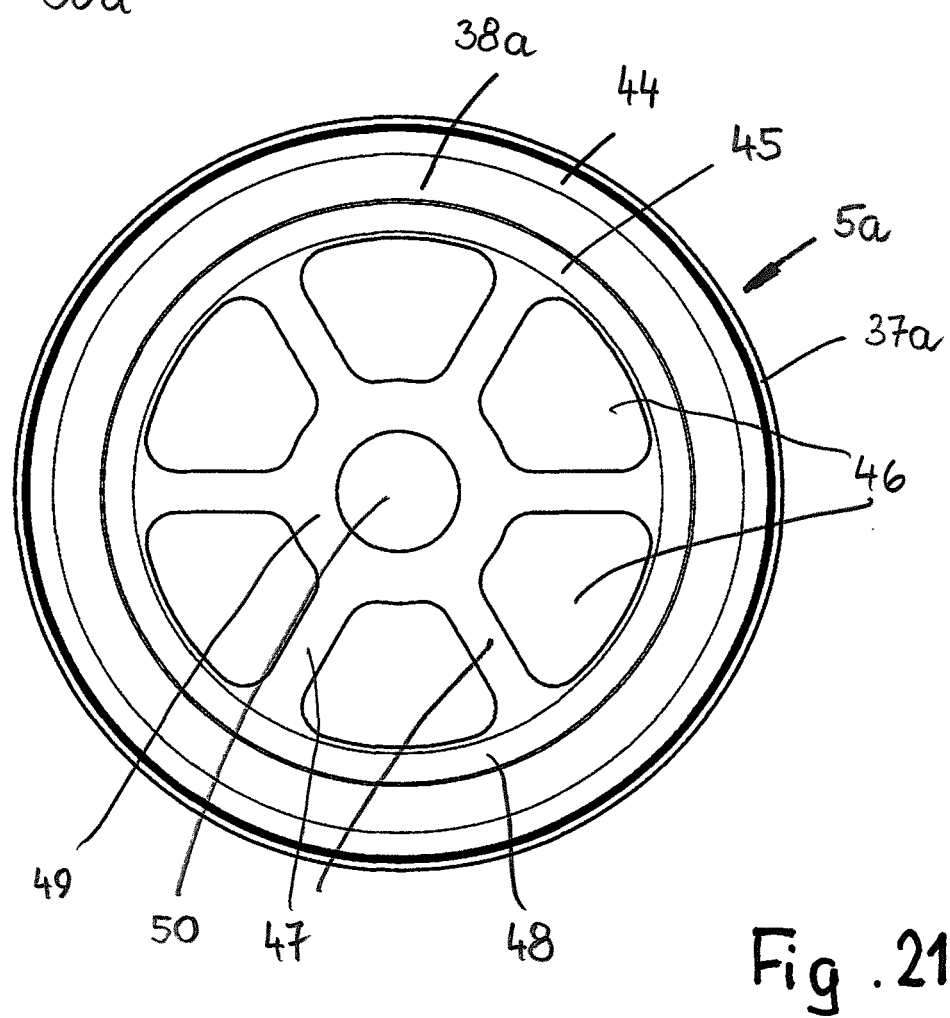
FIG. 21 shows the spider according to FIG. 20 in plan view.

In contrast to the embodiment according to FIGS. 11 to 16, the spider 5a has no longer a base member 34. It has instead the circumferentially extending annular flange 37a which is slightly slanted inwardly (FIG. 20). The annular flange 37a passes into a radial flange 44 which connects the annular flange 37a with the conical member 38a. The conical member 38a passes into a bottom 45 that is extending radially to the axis of the spider 5a and thus parallel to the radial flange 44. The bottom 45 has distributed about its circumference openings 46 that are separated from each other by radially extending stays 47. The stays 47 connect a radial outer annular bottom section 48 with a radial inner annular bottom section 49 (FIG. 21). The two annular bottom sections 48, 49 are positioned coaxially to the axis of the spider 5a. The inner bottom section 49 has a circular opening 50 through which the motor shaft 2 is projecting in the mounted position. The opening 50 of the spider 5a has a greater diameter than the central opening 41 of the separator 6a.

Figure 18:
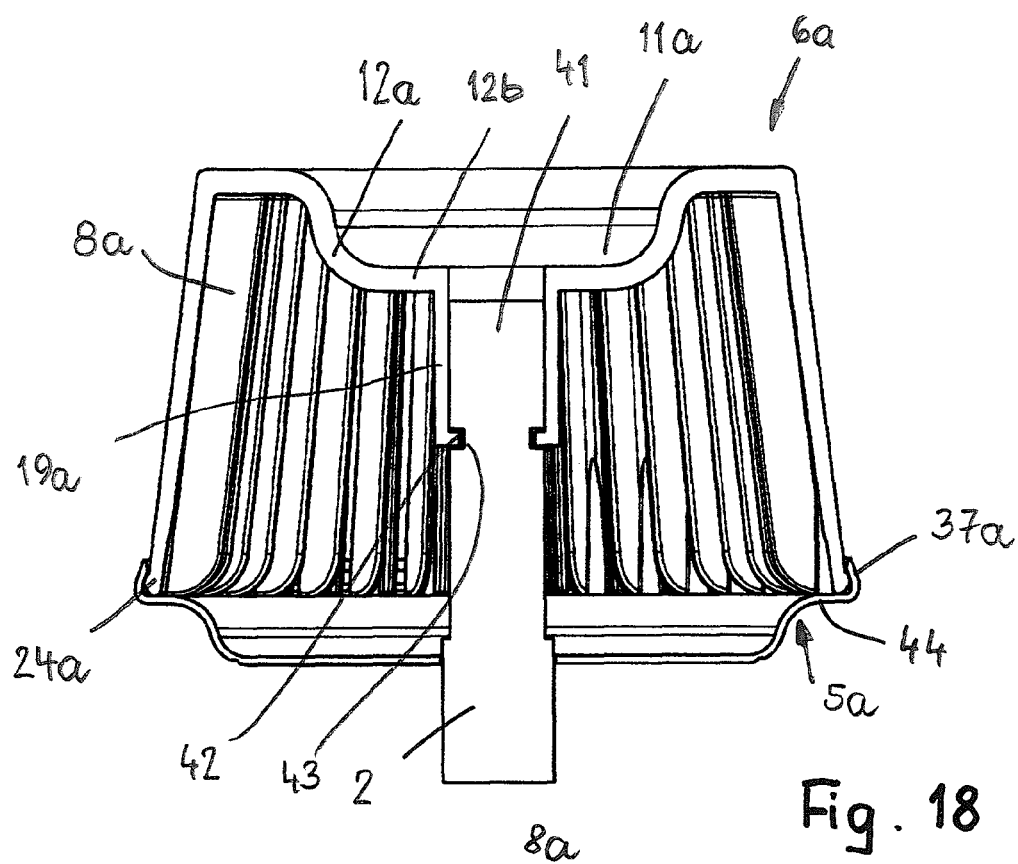
FIG. 18 shows in enlarged illustration the separator according to FIG. 17 in axial section.
Figure 19:
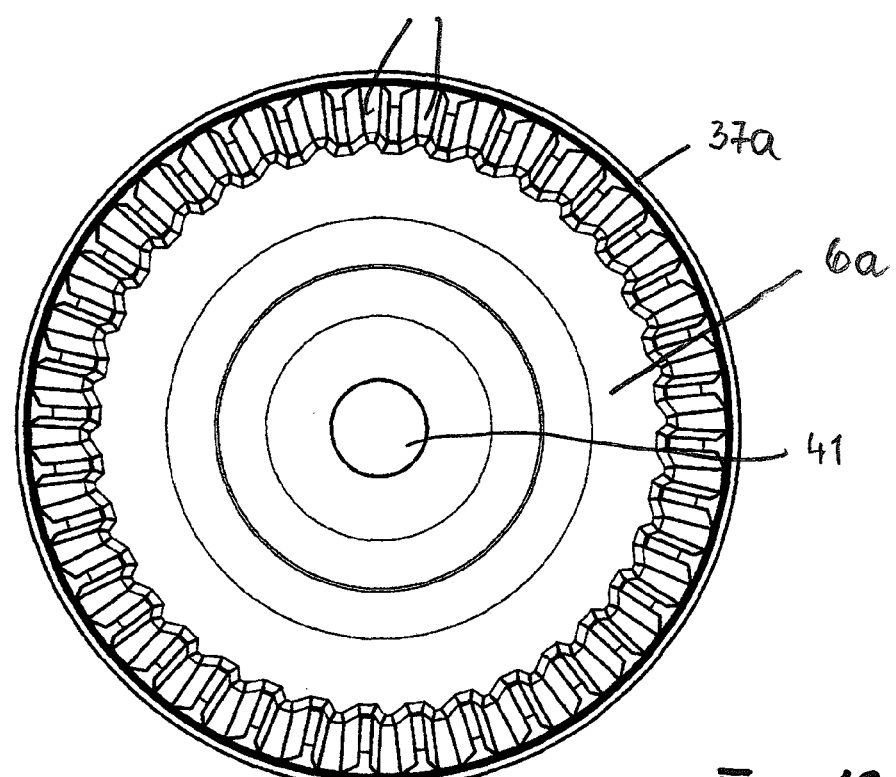
FIG. 19 is a plan view onto the separator according to FIG. 18.

The separator 6a is placed, similar to the preceding embodiments, onto the spider 5a wherein the webs 8a of the separator are first elastically bent inwardly in radial direction so that the locking contours 24a can be inserted into the space enclosed by the annular flange 37a. Then the webs 8a will spring back in radial direction outwardly until the locking contours 24a are resting on the inner side of the annular flange 37a with radial pretension (FIG. 18). The separator 6a is placed onto the spider 5a until the locking contours 24a are resting on the radial flange 44 of the spider 5a. The radial flange 44 has such a width that it projects inwardly past the locking contours 24a of the webs 8a. The webs 8a can be configured in accordance with the afore described embodiments.

In operation of the vacuum cleaner the separator 6a rotates at high rotary speed so that high centrifugal forces are acting on the webs 8a. Accordingly, they are forced with the locking contours 24a fixedly against the inner side of the annular flange 37a. The force is so great in this context that even without form-fit locking connection in rotational direction a reliable rotationally fixed connection between the separator 6a and the spider 5a is generated. The spider 5a which is seated rotationally fixedly on the motor shaft 2 therefore entrains perfectly the separator 6a upon operation of the vacuum cleaner in rotational direction.

This embodiment is characterized by a simple and inexpensive configuration. The rotational connection that is only provided by friction between the separator 6a and the spider 5a enables a simple constructive configuration of these two parts.

Since the separator 6a is secured by the projection 19a with the noses 42 axially on the motor shaft 2, it is not necessary to axially secure the separator 6a by means of screws and the like on the motor shaft 2. This facilitates mounting and removal of the separator 6a. As needed, it can be simply pulled off the motor shaft 2. The separator 6a can also be pulled simply off the spider 5a.

In one embodiment (not illustrated), the webs of the separator at the free end are not provided with a locking contour but have across their length a continuous identical cross-section as illustrated as an example in the left half of FIG. 10 for the web 8 illustrated therein without locking projection. Such a separator is then resting with its webs on the inner side of the inwardly slanted annular flange 37a of the spider 5a. The annular flange 37a as well as the exterior side of the webs of the separator are designed such that across the height of the annular flange 37a they are areally contacting each other. In this way, in interaction with the high centrifugal force upon operation of the vacuum cleaner, a reliable rotational driving action is achieved without a form-fit locking connection in circumferential direction or rotational direction between the separator and the spider being required. The height of the annular flange 37a is selected such that the reliable rotational entrainment of the separator by the spider is ensured.

When the webs 8a have the locking contour 24a which is, for example, designed as a locking projection, then the annular flange 37a is advantageously designed such that it engages across the locking projection 24a (FIG. 8).

In another embodiment, it is possible to arrange the webs 8, 8a of the separator so as not extend at a slant outwardly but perpendicularly so that the exterior side of the webs are positioned on a cylinder wall. The annular flange 37, 37a of the spider 5, 5a is then positioned also on a cylinder wall. At least some of the webs of the separator are respectively provided with at least one form-fit locking element, for example, a recess or a projection, which interacts with a corresponding counter form-fit locking element of the annular flange of the spider, for example, a projection or a recess. The outer radius of the imaginary cylinder on which the outer sides of the webs 8, 8a of the separator are positioned is slightly smaller than the inner radius of the annular flange 37, 37a. In this way, the separator can be simply placed onto the spider. The form-fit and counter form-fit locking elements are designed such that they engages each other minimally. As soon as the spider and the separator are driven at high rotary speed of the motor shaft 2, the webs 8, 8a of the separator are forced radially outwardly so that the full form-fit locking action between the form-fit and counter form-fit locking elements is achieved. In this way, a reliable torque entrainment of the separator by the spider is also ensured.

As in the preceding embodiment, the spider 5a is advantageously monolithically formed of plastic material.

As a result of the selected rotary speed of the separator, on the ends of the slats centrifugal forces are acting which effect the self-securing action in the spider. For a minimal rotary speed of approximately 6,000 per minute, as is the case for air cleaning with water vacuum cleaners, depending on the selected mass of the individual slats a centrifugal force of 1.5 N–7 N on the ends of the slats will occur. For a maximum rotary speed of approximately 25,000 per minute, the centrifugal force, depending on the mass of the slats, will increase to 20-120 N at the abutment points of the ends of the slats. With these forces it is ensured that the separator with increasing rotary speed is secured absolutely safely in the contour of the spider. Also, the occurring centrifugal forces create a high frictional force on the contour which is engaging the spider so that the separator is entrained by the spider at the same rotary speed. Due to this property, it is not necessary that on the separator and on the spider form-fit locking contour(s) must be provided. The indicated values are not to be understood as limiting.

The specification incorporates by reference the entire disclosure of German priority document 10 2013 005 306.4 having a filing date of Mar. 25, 2013.

While specific embodiments of the invention have been shown and described in detail to illustrate the inventive principles, it will be understood that the invention may be embodied otherwise without departing from such principles.

What is claimed is:

1. A separator for a vacuum cleaner, the separator comprising:
   a cover part;
   webs connected to the cover part and extending away from the cover part;
   wherein the webs are provided along a circumference of the cover part at a spacing to each other and one behind the other in a circumferential direction of the separator, wherein through openings are formed between the webs;
   wherein at least some of the webs at an end facing away from the cover part are not connected to each other;
   wherein the webs are elastically yielding in a direction transverse to a longitudinal extension of the webs.

2. The separator according to claim 1, wherein at least two of the webs at the end facing way from the cover part are provided with a locking contour.

3. The separator according to claim 2, wherein the locking contour in the circumferential direction of the separator has a width that is identical to a width of the web at which the locking contour is provided.

4. The separator according to claim 2, wherein the locking contour extends at least across two neighboring webs.

5. The separator according to claim 2, wherein the locking contour is formed monolithically with the web.

6. The separator according to claim 2, wherein the locking contour is a locking projection.

7. The separator according to claim 6, wherein the locking projection has a slanted surface provided on a side of the locking projection that is facing away from the web.

8. The separator according to claim 6, wherein the locking projection has a blocking surface that is facing the web.

9. The separator according to claim 1, wherein the webs have a constant cross-section at least at the end facing away from the cover part.

10. The separator according to claim 1, wherein the webs are oriented away from the cover part at a slant in radial outward direction.

11. The separator according to claim 1, wherein the webs are positioned on an imaginary cylinder wall.

12. The separator according to claim 1, comprising with at least one form-fit locking element.

13. A vacuum cleaner comprising a separator according to claim 1.

14. A separating device comprising:
    a spider; and
    a separator according to claim 1;
    wherein the spider has at least one follower element on which the webs of the separator are resting under radial force in operation of the separating device.

15. The separating device according to claim 14, wherein the follower element is a ring which is engaged from below by the locking contour.

16. The separating device according to claim 14, wherein at least two of the webs at the end facing way from the cover part are provided with a locking contour, wherein the follower element is an annular flange that is provided with locking openings for the locking contours.

17. The separating device according to claim 14, wherein the follower element is an annular flange whose wall is slanted in radial direction inwardly.

18. The separating device according to claim 17, wherein the webs of the separator are resting areally on the inner side of the annular flange.

19. The separating device according to claim 14, wherein the separator and the spider each have a centering part that are interacting with each other such that the separator and the spider are axially aligned with each other.

20. The separating device according to claim 19, wherein the centering parts are annular projections each having an axis coaxial with an axis of the spider and an axis of the separator, respectively.

21. A vacuum cleaner comprising a separating device according to claim 14.

* * * * *